United States Patent
Chen et al.

(10) Patent No.: US 10,997,732 B2
(45) Date of Patent: May 4, 2021

(54) INFORMATION DISPLAY SYSTEM AND INFORMATION DISPLAY METHOD

(71) Applicants: Industrial Technology Research Institute, Hsinchu (TW); Intellectual Property Innovation Corporation, Hsinchu (TW)

(72) Inventors: Jian-Lung Chen, Taoyuan (TW); Chih-Chia Chang, Hsinchu County (TW); Yu-Hsin Lin, Miaoli County (TW); Shin-Hong Kuo, New Taipei (TW)

(73) Assignees: Industrial Technology Research Institute, Hsinchu (TW); Intellectual Property Innovation Corporation, Hsinchu (TW)

(*) Notice: Subject to any disclaimer, the term of this patent is extended or adjusted under 35 U.S.C. 154(b) by 127 days.

(21) Appl. No.: 16/351,512

(22) Filed: Mar. 13, 2019

(65) Prior Publication Data
US 2020/0151886 A1 May 14, 2020

(30) Foreign Application Priority Data
Nov. 8, 2018 (TW) ................... 107139725

(51) Int. Cl.
*G06T 7/246* (2017.01)
*G06K 9/00* (2006.01)

(52) U.S. Cl.
CPC .......... *G06T 7/246* (2017.01); *G06K 9/00671* (2013.01); *G06K 9/00744* (2013.01); *G06T 2207/30241* (2013.01)

(58) Field of Classification Search
CPC . G06T 7/246; G06T 2207/30241; G06T 7/20; G06K 9/00671; G06K 9/00744; G06K 9/00724; G06F 3/14
(Continued)

(56) References Cited

U.S. PATENT DOCUMENTS 8,466,894 B2 6/2013 Sugita et al.
9,317,113 B1 4/2016 Karakotsios et al.
(Continued)

FOREIGN PATENT DOCUMENTS

CN 103366708 10/2013
CN 108111752 6/2018
(Continued)

OTHER PUBLICATIONS

"Office Action of Taiwan Counterpart Application", dated May 10, 2019, p. 1-p. 5.

*Primary Examiner* — Jerome Grant, II
(74) *Attorney, Agent, or Firm* — JCIPRNET

(57) ABSTRACT

An information display system and an information display method are provided. The information display system includes a display screen, an image-capture device, and a processing device. The image-capture device captures a picture sequence. The processing device is coupled to the display screen and the image-capture device. The processing device recognizes at least one dynamic object in the picture sequence and generates a recognition frame and a recognition information corresponding to the dynamic object. The processing device tracks a recognition frame of a plurality of first pictures in the picture sequence to obtain a tracking result. The processing device compensates a display coordinate of a recognition information of a second picture in the picture sequence according to the tracking result to obtain a compensated coordinate, and displays the recognition information on the display screen according to the compensated coordinate to reduce a jitter of the recognition information displayed on the display screen. The first pictures are prior to the second picture in terms of time sequence.

20 Claims, 13 Drawing Sheets

(58) Field of Classification Search
USPC .......................................................... 382/103
See application file for complete search history.

(56) References Cited

U.S. PATENT DOCUMENTS

| | | |
|---|---|---|
| 2006/0262140 A1 | 11/2006 | Kujawa et al. |
| 2012/0056896 A1 | 3/2012 | Border |
| 2012/0072873 A1 | 3/2012 | Park et al. |
| 2015/0350716 A1* | 12/2015 | Kruglick .......... H04N 21/44008 |
| | | 386/241 |
| 2016/0252966 A1 | 9/2016 | Lee |
| 2018/0109711 A1* | 4/2018 | Liu ...................... H04N 5/2353 |
| 2018/0121736 A1* | 5/2018 | Tsunashima ....... H04N 5/23206 |
| 2018/0348058 A1* | 12/2018 | Munir ................... G01J 5/0025 |
| 2020/0089965 A1* | 3/2020 | Hollander .......... G06K 9/00771 |
| 2020/0217952 A1* | 7/2020 | Rider ................... G05D 1/0253 |
| 2020/0219269 A1* | 7/2020 | Zhang ................ G06K 9/00744 |

FOREIGN PATENT DOCUMENTS

| | | | | |
|---|---|---|---|---|
| CN | 109934848 | * | 6/2019 | ............. G06T 7/246 |
| TW | 201333753 | | 8/2013 | |

\* cited by examiner

INFORMATION DISPLAY SYSTEM AND INFORMATION DISPLAY METHOD

CROSS-REFERENCE TO RELATED APPLICATION

This application claims the priority benefit of Taiwan application serial no. 107139725, filed on Nov. 8, 2018. The entirety of the above-mentioned patent application is hereby incorporated by reference herein.

TECHNICAL FIELD

The disclosure relates to an information display system and an information display method.

BACKGROUND

With the development of technology, the application of transparent displays has become more diverse. The transparent display is such that its display panel has a certain degree of light penetration and may clearly display the background behind the panel. The transparent display is suitable for a variety of applications such as building windows, vehicle windows, and shop windows.

In addition to the original transparent display function, the transparent display may also be applied to the display of dynamic information. That is, when a user views an object of the display panel relative to the other side of the user via the transparent display, the recognition information of the object may be correspondingly displayed in the periphery of the object display position of the transparent display. However, when the object moves or jitters, the display position of the recognition information of the object also correspondingly moves or jitters. As a result, the viewing comfort of the user is affected.

SUMMARY

An information display system of an embodiment of the disclosure includes a display screen, an image-capture device, and a processing device. The image-capture device captures a picture sequence. The processing device is coupled to the display screen and the image-capture device. The processing device recognizes at least one dynamic object in the picture sequence and generates a recognition frame and a recognition information corresponding to the dynamic object. The processing device tracks a recognition frame of a plurality of first pictures in the picture sequence to obtain a tracking result. The processing device compensates a display coordinate of a recognition information of a second picture in the picture sequence according to the tracking result to obtain a compensated coordinate and displays the recognition information on the display screen according to the compensated coordinate. The first pictures are prior to the second picture in terms of a time sequence.

An information display method of an embodiment of the disclosure includes the following steps. A picture sequence is captured by an image-capture device. The following steps are executed by a processing device. At least one dynamic object in the picture sequence is recognized to obtain a recognition frame and a recognition information corresponding to the dynamic object. A recognition frame of a plurality of first pictures in the picture sequence is tracked to obtain a tracking result. A display coordinate of a recognition information of a second picture in the picture sequence is compensated according to the tracking result to obtain a compensated coordinate, wherein the first pictures are prior to the second picture in terms of a time sequence. The recognition information is displayed on a display screen according to the compensated coordinate.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

Figure 1:
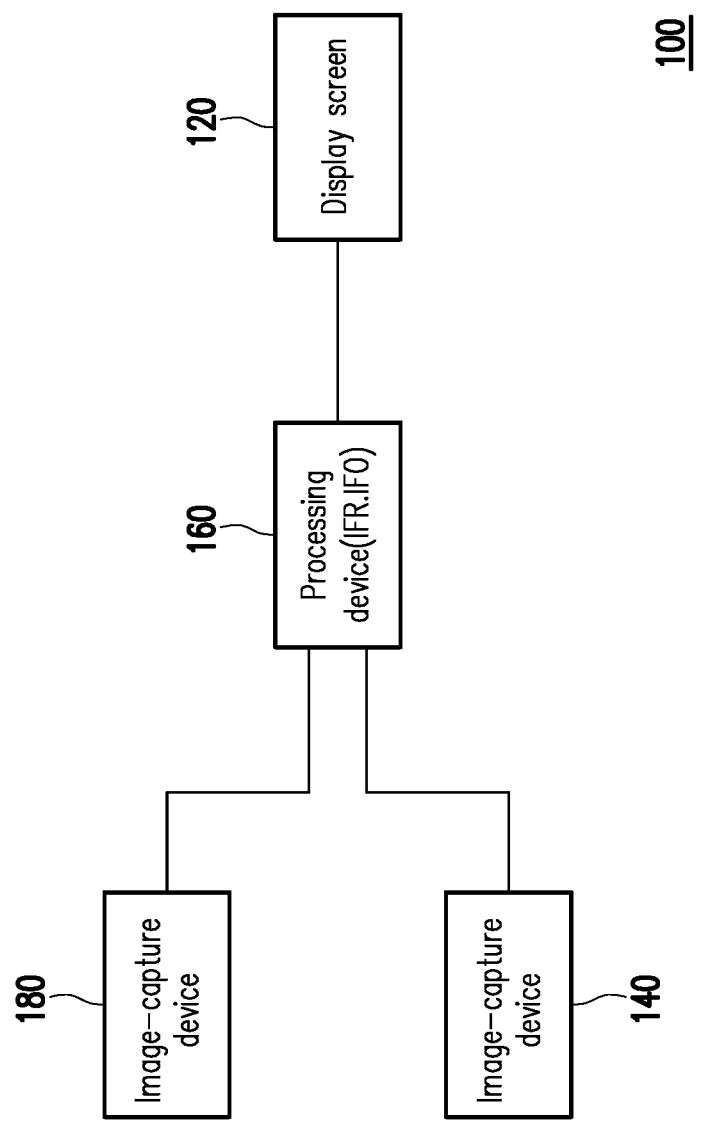
FIG. 1 is a block diagram of an information display system shown according to an embodiment of the disclosure.

A portion of the embodiments of the disclosure is described in detail hereinafter with reference to figures. In the following, the same reference numerals in different figures should be considered to represent the same or similar elements. These embodiments are only a portion of the disclosure and do not disclose all of the possible implementations of the disclosure. More precisely, these embodiments are only exemplary embodiments of the information display system and the information display method in the disclosure.

Figure 2:
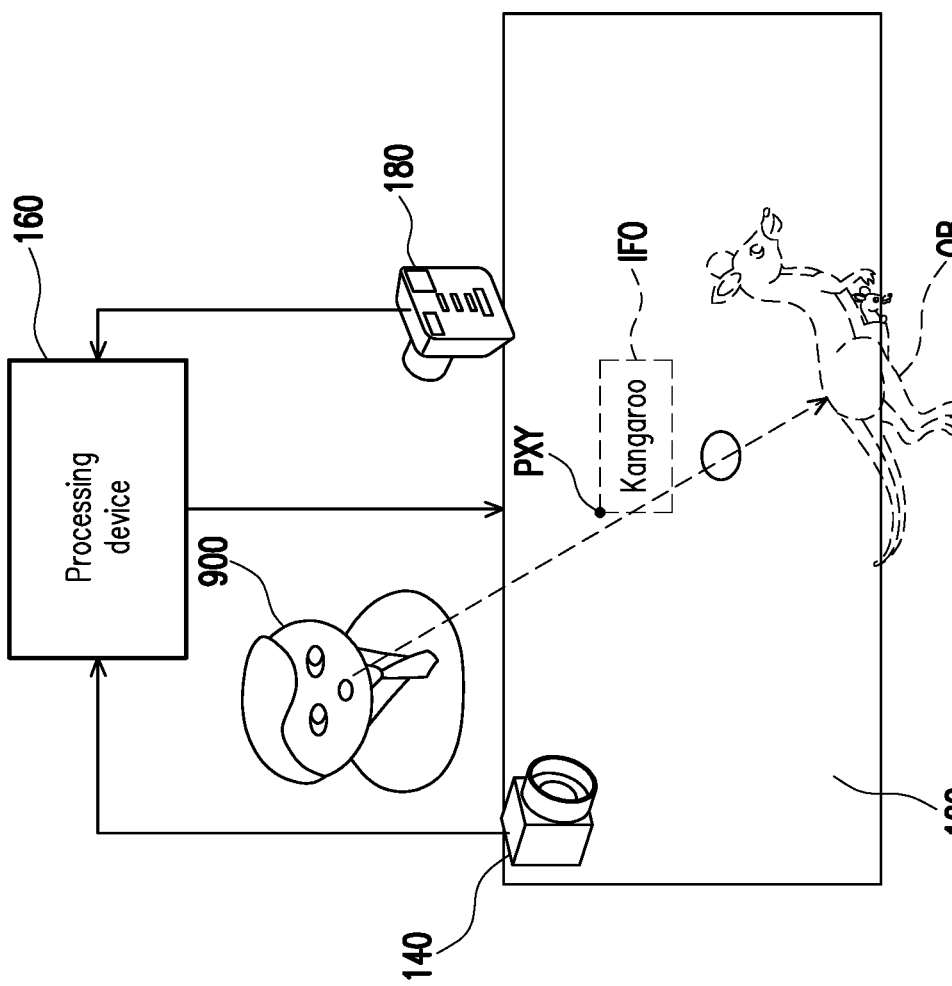
FIG. 2 is an application context schematic of an information display system shown according to an embodiment of the disclosure.

FIG. 1 is a block diagram of an information display system shown according to an embodiment of the disclosure, and FIG. 2 is an application context schematic of an information display system shown according to an embodiment of the disclosure. Please refer to FIG. 1 and FIG. 2 together. An information display system 100 includes a display screen 120, image-capture devices 140 and 180, and a processing device 160, but the disclosure is not limited thereto. In the embodiment shown in FIG. 2, a user 900 is located at a first side of the display screen 120, and views a dynamic object OB at a second side of the display screen 120 via the display screen 120, wherein the quantity of the dynamic object OB is at least one.

In an embodiment of the disclosure, the display screen 120 is, for example, a transparent display screen. The transparent display screen indicates that the display screen itself has a certain degree of light penetration and may show the background behind the display screen. The display screen 120 implemented as a transparent display screen may be applied to a variety of applications such as viewing windows in buildings (e.g., viewing platforms, aquariums, and museums), display windows, vehicle glass, and displays.

The image-capture device 180 is configured to obtain an image of the user 900. In an embodiment of the disclosure, the image-capture device 180 may further include an eye tracking device for tracking the line of sight of the user 900 to determine whether the line of sight of the user 900 is toward the display screen 120. In an embodiment of the disclosure, the information display system 100 may also omit the image-capture device 180.

The image-capture device 140 is configured to capture a picture sequence, such as a motion image at the second side of the display screen 120. The processing device 160 may be coupled to the display screen 120 and the image-capture devices 140 and 180. The processing device 160 is configured to recognize the dynamic object OB in the picture sequence and generates a recognition frame IFR and a recognition information IFO corresponding to the dynamic object OB.

The picture sequence may include a plurality of first pictures and a second picture, wherein the first pictures are prior to the second picture in terms of time sequence. The processing device 160 may track the recognition frame IFR in the first pictures to obtain a tracking result and compensate the display coordinate of the recognition information IFO of the second picture according to the tracking result to obtain a compensated coordinate PXY. The processing device 160 may display the recognition information IFO on the display screen 120 according to the compensated coordinate PXY to reduce the jitter of the recognition information IFO displayed on the display screen 120.

Figure 3B:
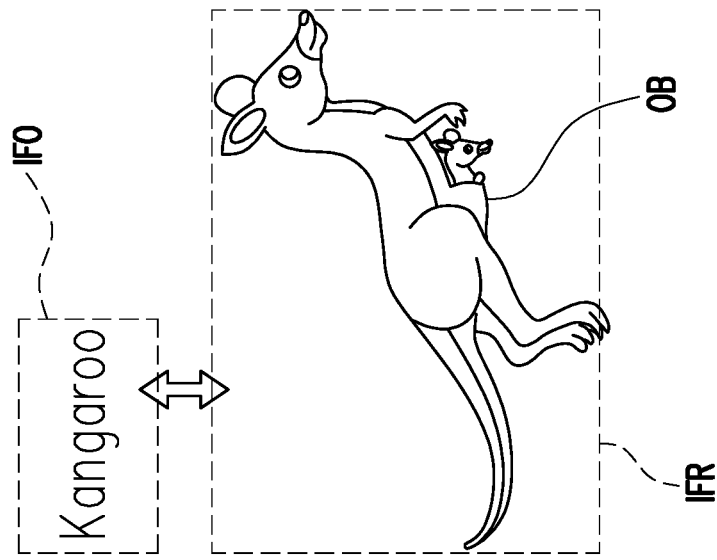
FIG. 3B is a schematic of the connection between a recognition information of a dynamic object and a recognition frame of the dynamic object shown according to an embodiment of the disclosure.
Figure 3A:
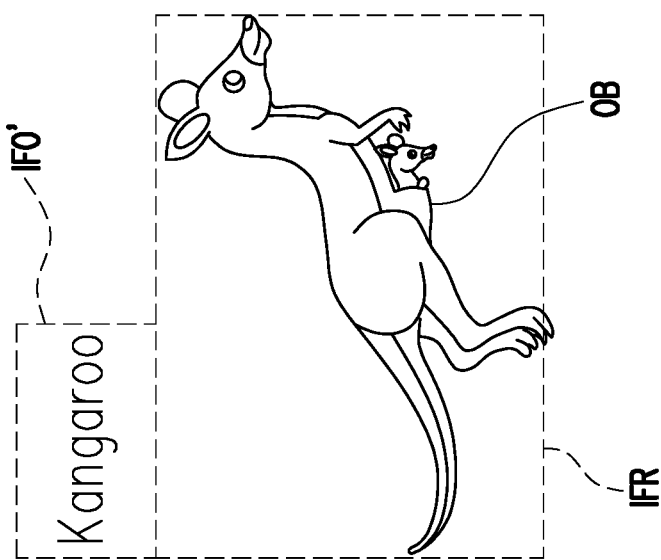
FIG. 3A shows a schematic of a recognition information of a dynamic object directly connected to a recognition frame of the dynamic object.

For example, as shown in FIG. 3A, a recognition information IFO' of the dynamic object OB is directly connected to the recognition frame IFR of the dynamic object OB. When the dynamic object OB jumps, the recognition frame IFR of the dynamic object OB is also linked, such that the recognition information IFO' of the dynamic object OB also jumps at the same amplitude. As a result, the viewing comfort of the user for the dynamic object OB is affected. As shown in FIG. 3B, by compensating the display coordinate of the recognition information IFO of the dynamic object OB, the recognition information IFO of the dynamic object OB may be prevented from jumping with the recognition frame IFR at the same amplitude, such that the jitter of the recognition information IFO is reduced.

In an embodiment of the disclosure, the image-capture devices 140 and 180 may include an imaging lens having a lens and a photosensitive element. The photosensitive element is configured to sense the intensity of light entering the lens to produce an image. The photosensitive element may be, for example, a charge-coupled device (CCD), a complementary metal-oxide semiconductor (CMOS) device, or other devices, and the disclosure is not limited thereto. In another embodiment, the image-capture devices 140 and 180 may also include a programmable processing unit, a micro-processor, an application-specific integrated circuit (ASIC), a programmable logic device (PLD), or other similar circuit devices that perform the function of recognizing an object, but the disclosure is not limited thereto.

In another embodiment of the disclosure, the image-capture devices 140 and 180 may be, for example, radar devices. The radar devices may transmit a microwave or radio signal via a radar antenna and sense an echo signal after the microwave or radio signal is reflected by the object so as to perform signal processing on the echo signal to generate a radar image picture.

In yet another embodiment of the disclosure, the image-capture devices 140 and 180 may be, for example, lidar devices. The lidar devices may emit a light wave or a laser signal and sense an echo signal after the light wave or the laser signal is reflected by the object so as to perform signal processing on the echo signal to generate a lidar image picture.

In an embodiment of the disclosure, the processing device 160 may be implemented by at least one system-on-a-chip (SOC), a field-programmable gate array (FPGA) chip, a complex programmable logic device (CPLD), a microprocessor, a central processing unit (CPU), a digital signal processor (DSP), or other hardware devices with computing power.

In an embodiment of the disclosure, the information display system 100 may also include a storage device (not shown). The storage device is configured to store data such as an image or a program, and may be, for example, any type of fixed or removable random-access memory (RAM), read-only memory (ROM), flash memory, hard disk or other similar devices, an integrated circuit, and a combination thereof.

Figure 4:
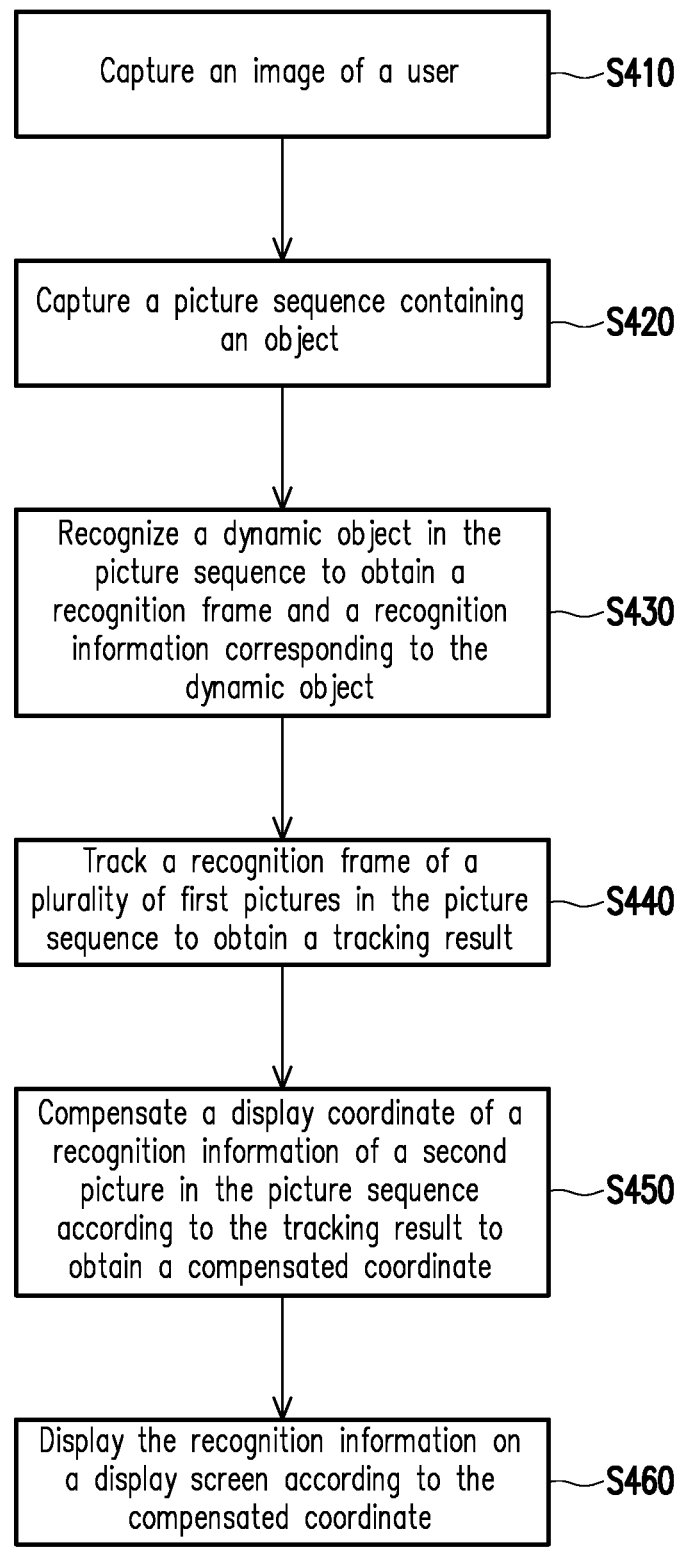
FIG. 4 is a flowchart of an information display method shown according to an embodiment of the disclosure.

FIG. 4 is a flowchart of an information display method shown according to an embodiment of the disclosure. The method flow shown in FIG. 4 may be implemented in conjunction with the information display system 100 shown in FIG. 1, but is not limited thereto. Please refer to FIG. 1, FIG. 2, and FIG. 4 together.

First, in step S410, an image of the user 900 is captured by the image-capture device 180, wherein the user 900 is located at the first side of the display screen 120. As previously described, the information display system 100 may omit the image-capture device 180, and therefore in an embodiment of the disclosure, step S410 may also be omitted. In step S420, a picture sequence containing an object is captured by the image-capture device 140, and the picture sequence is, for example, a motion image at the second side of the display screen 120. Then, steps S430, S440, S450, and S460 may be executed by the processing device 160. In step S430, the dynamic object OB in the picture sequence is recognized to obtain the recognition frame IFR and the recognition information IFO corresponding to the dynamic object OB. Then, in step S440, the recognition frame IFR of a plurality of first pictures in the picture sequence is tracked to obtain a tracking result. In step S450, the display coordinate of the recognition information IFO of the second picture in the picture sequence is compensated according to the tracking result to obtain a compensated coordinate PXY. In step S460, the recognition information IFO is displayed on the display screen 120 according to the compensated coordinate PXY.

In an embodiment of the disclosure, between step S430 and step S440, whether the dynamic object OB appears in the second picture may be determined by the processing device 160 to obtain a first determination result. If the first determination result is yes (that is, the dynamic object OB appears in the second picture), then step S440 is executed. If the first determination result is no (that is, the dynamic object OB does not appear in the second picture), then the display screen 120 is controlled to stop displaying the recognition information IFO.

In another embodiment of the disclosure, between step S430 and step S440, whether the user 900 views the dynamic object OB may be determined according to the image of the user 900 obtained in step S410 by the processing device 160 to obtain a second determination result. If the second determination result is yes (i.e., the user 900 is viewing the dynamic object OB), then step S440 is executed. If the second determination result is no (i.e., the user 900 does not view the dynamic object OB), then the display screen 120 is controlled to stop displaying the recognition information IFO.

In an embodiment of the disclosure, the tracking result obtained via step S440 may include a plurality of first amounts of displacement and a second amount of displacement. In detail, each of the first amounts of displacement is an amount of displacement of the recognition frame IFR between two adjacent pictures in the first pictures, and the second amount of displacement is an amount of displacement of the recognition frame IFR between the first one and the Nth one of the first pictures, wherein N is the quantity of the first pictures. In other words, the second amount of displacement is the amount of displacement of the recognition frame IFR between the first first picture and the last first picture.

Figure 5:
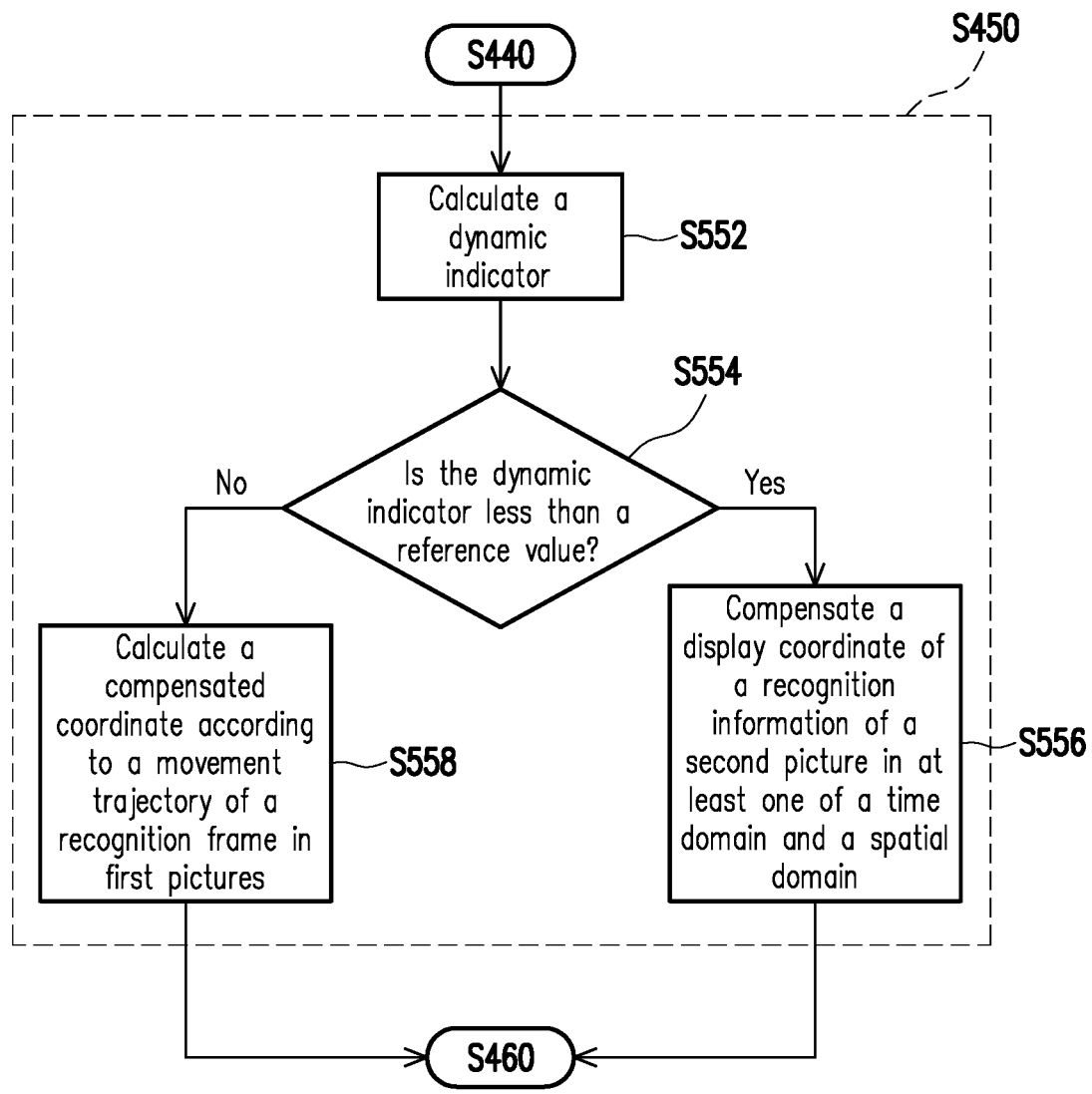
FIG. 5 is a flowchart of the detailed steps of step S450 shown according to an embodiment of the disclosure.

The detailed steps of step S450 are described below. FIG. 5 is a flowchart showing the detailed steps of step S450 shown according to an embodiment of the disclosure. Please refer to FIG. 1, FIG. 2, and FIG. 5 together. Step S450 includes detailed steps S552, S554, S556, and S558. In step S552, a dynamic indicator is calculated $$F = \frac{U2}{U1\sqrt{(N-1)}},$$

wherein U2 is the second amount of displacement, and U1 is the average value of the first amounts of displacement.

The movement state of the dynamic object OB in the first pictures may be determined according to a dynamic indicator F. A greater value of the dynamic indicator F indicates the movement of the dynamic object OB may be a movement with a net direction and a net speed instead of a random movement in the vicinity of a specific position. A smaller value of the dynamic indicator F indicates the movement of the dynamic object OB may be a random movement in the vicinity of a specific position, rather than a movement with a net direction and a net speed. Therefore, in step S554, whether the dynamic indicator F is less than a reference value is determined. In an embodiment of the disclosure, the reference value may be determined according to probability theory, and the value thereof may be, for example, between 1.3 and 3.4. In other embodiment, the reference value thereof may be, for example, between 2.2 and 2.5, but the disclosure is not limited thereto. In other embodiments of the disclosure, the reference value may also be set according to actual application or design requirements.

If the determination result of step S554 is yes (i.e., the dynamic indicator F is less than the reference value), then the movement of the dynamic object OB is a random movement in the vicinity of a specific position, and step S556 is executed. In step S556, the display coordinate of the recognition information IFO of the second picture is compensated in at least one of the time domain and the spatial domain. In other words, the display coordinate of the recognition information IFO of the second picture may be compensated only in the time domain. Alternatively, the display coordinate of the recognition information IFO of the second picture may be compensated only in the spatial domain. Or, the display coordinate of the recognition information IFO of the second picture is compensated in the time domain and the spatial domain.

On the other hand, if the determination result of step S554 is no (that is, the dynamic indicator F is greater than or equal to the reference value), then the movement of the dynamic object OB is a movement with a net direction and a net speed, and step S558 is executed. In step S558, the compensated coordinate PXY is calculated according to the movement trajectory of the recognition frame IFR in the first pictures.

Figure 6:
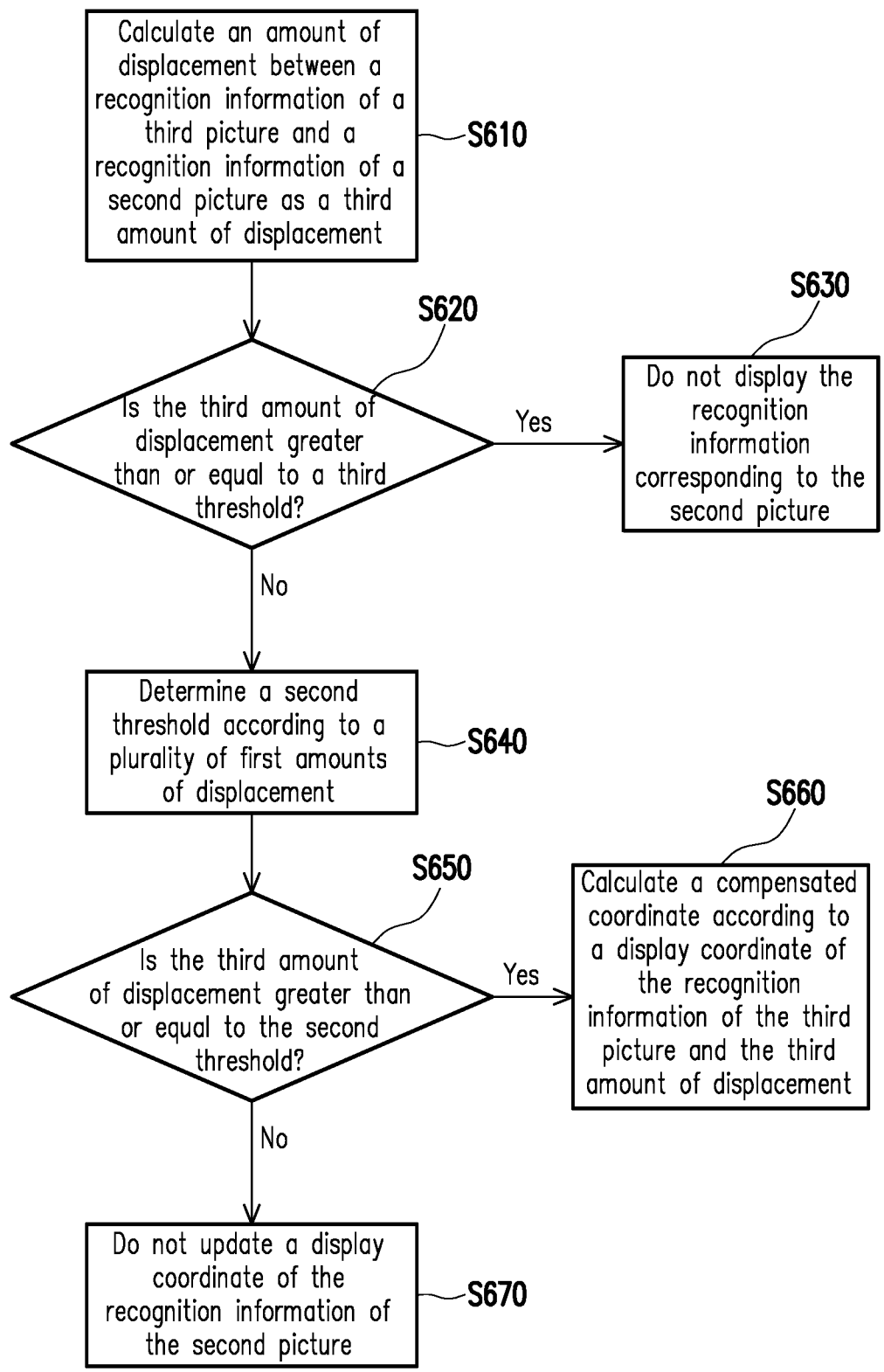
FIG. 6 is a flowchart of the compensation of a display coordinate of a recognition information of a second picture in a time domain shown according to an embodiment of the disclosure.
Figure 7A:
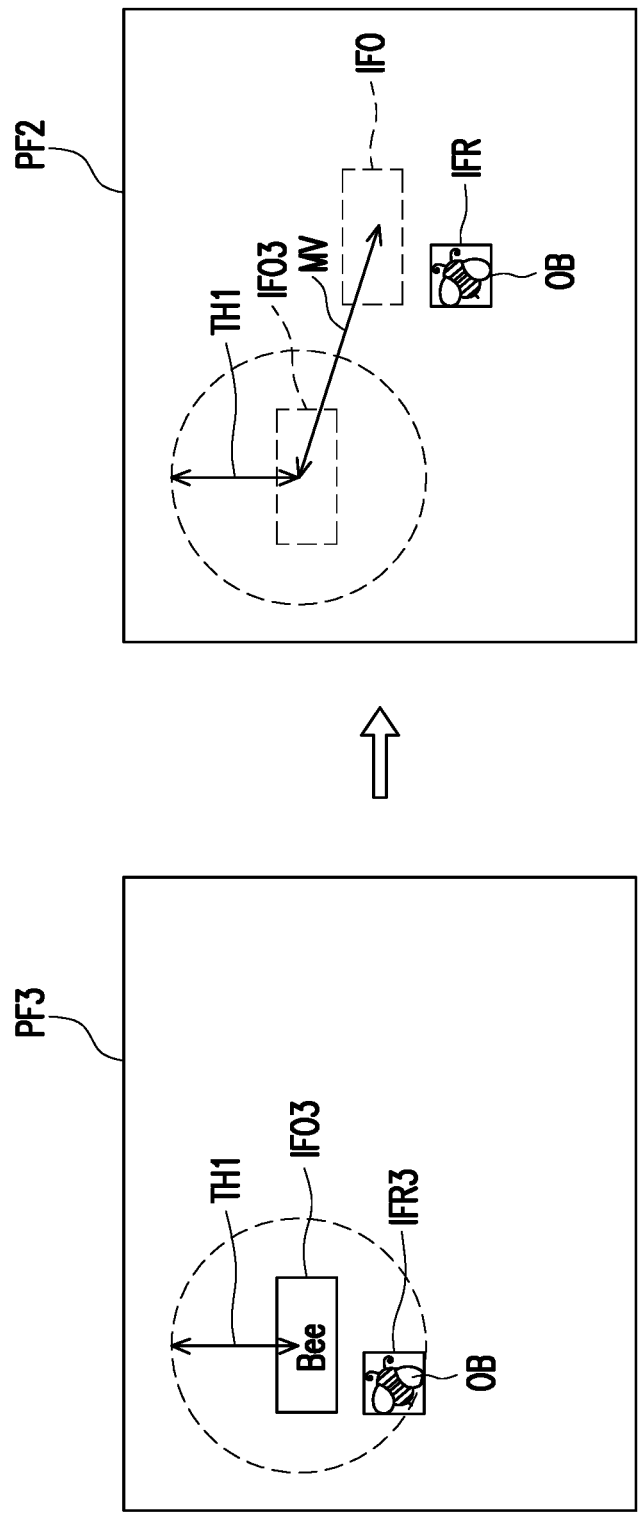
FIG. 7A to FIG. 7C are schematics of the compensation of a display coordinate of a recognition information of a second picture in a time domain according to an embodiment of the disclosure.
Figure 7B:
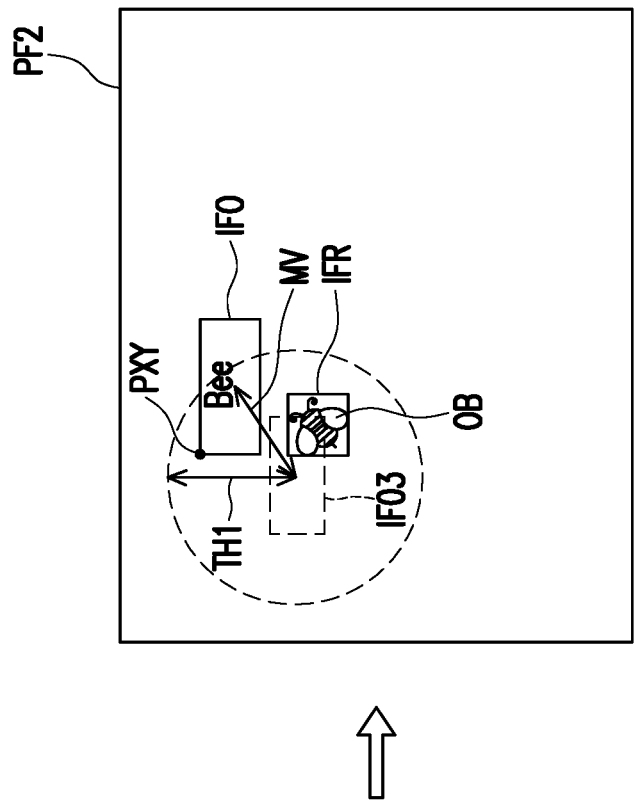
Figure 7B:
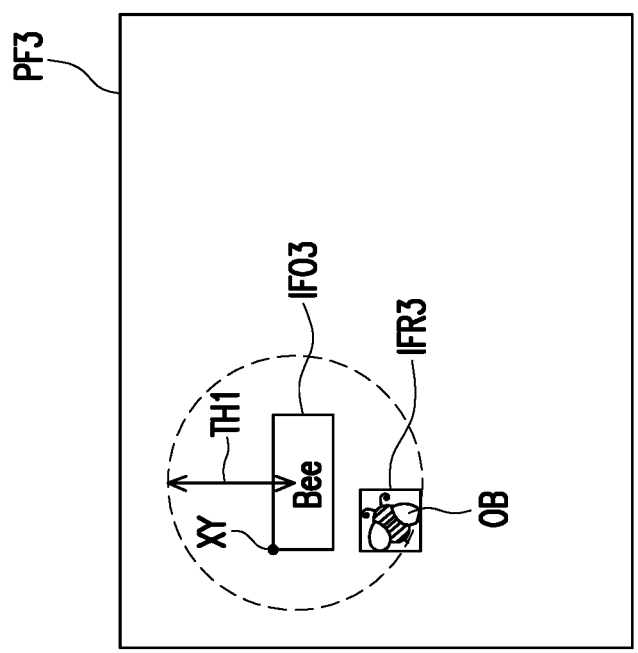
Figure 7C:
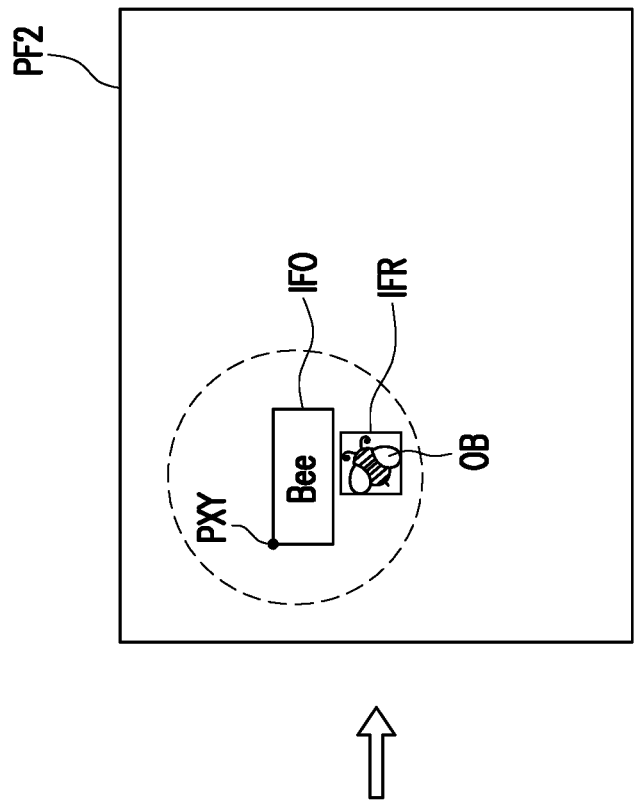
Figure 7C:
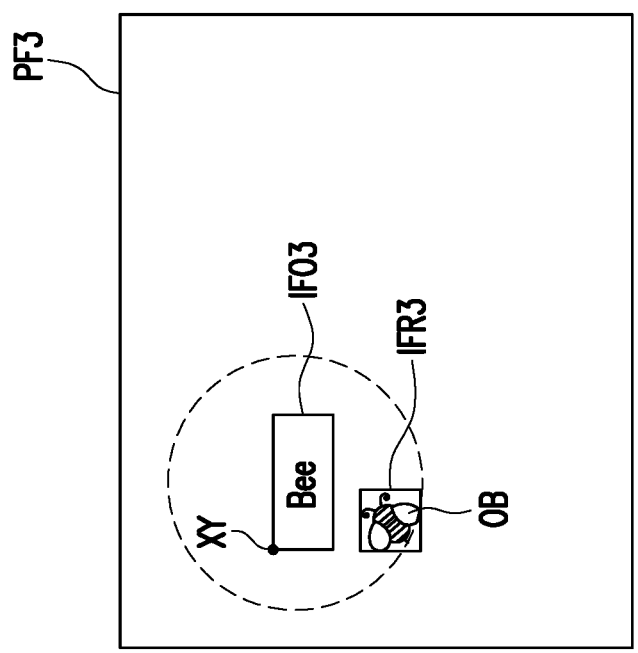

First, the details of compensating the display coordinate of the recognition information IFO of the second picture in the time domain is described. FIG. 6 is a flowchart of the compensation of a display coordinate of a recognition information of a second picture in a time domain shown according to an embodiment of the disclosure. FIG. 7A to FIG. 7C are schematics of the compensation of a display coordinate of a recognition information of a second picture in a time domain. A third picture PF3 of the picture sequence shown in FIG. 7A to FIG. 7C is the previous picture of a second picture PF2. In addition, FIG. 7A to FIG. 7C also show a recognition frame IFR3 and a recognition information IFO3 of the dynamic object OB in the third picture PF3 and the recognition frame IFR and the recognition information IFO of the dynamic object OB in the second picture PF2.

Hereinafter, please refer to FIG. 1, FIG. 6, and FIG. 7A to FIG. 7C together. In step S610, an amount of displacement between the recognition information IFO3 of the third picture PF3 and the recognition information IFO of the second picture PF2 is calculated as a third amount of displacement MV, wherein the third picture PF3 is the previous picture of the second picture PF2. In step S620, whether the third amount of displacement MV is greater than or equal to a first threshold TH1 is determined. If the determination result of step S620 is yes, that is, the third amount of displacement MV is greater than or equal to the first threshold TH1, then the movement distance of the recognition information IFO is too large, as shown in FIG. 7A, and step S630 is executed. In step S630, the processing device 160 controls the display screen 120 to not display the recognition information IFO corresponding to the second picture PF2 to prevent rapid movement (i.e., moving distance too large) of the recognition information IFO and causing discomfort to the user during viewing. If the determination result of step S620 is no, that is, the third amount of displacement MV is less than the first threshold TH1, as shown in FIG. 7B, then the display screen 120 displays the recognition information IFO corresponding to the second picture PF2.

In an embodiment of the disclosure, the designer may define the first threshold TH1 based on the user's comfort in viewing a text movement. For example, the first threshold TH1 may be, for example, a product of a reference speed and a picture update time of the display screen 120, wherein the reference speed is, for example, the maximum speed at which the user may tolerate the text movement. However, the disclosure is not limited thereto.

In an embodiment of the disclosure, the update frequency of the display coordinate of the recognition information IFO may also be reduced in the time domain to reduce the jitter of the recognition information IFO on the display screen 120. In detail, if the determination result of step S620 is no, that is, the third amount of displacement MV is less than the first threshold TH1, and then step S640 is executed. In step S640, a second threshold TH2 is determined according to the plurality of first amounts of displacement, wherein the update frequency of the display coordinate of the recognition information IFO may be reduced by the second threshold TH2, and the second threshold TH2 is less than the first threshold TH1. Next, in step S650, whether the third amount of displacement MV is greater than or equal to the second threshold TH2 is determined.

If the determination result of step S650 is yes, then step S660 is executed to update the display coordinate of the recognition information IFO of the second picture PF2, as shown in FIG. 7B. In step S660, the compensated coordinate PXY is calculated according to the display coordinate XY of the recognition information IFO3 of the third picture PF3 and the third amount of displacement MV, but the disclosure is not limited thereto. In other embodiments of the disclosure, the compensated coordinate PXY in step S660 may also be calculated by using the compensation method of the spatial domain, which is described in detail later.

If the determination result of step S650 is no, then the position of the recognition information IFO of the second picture PF2 may be the display coordinate adjacent to the recognition information IFO3 of the third picture PF3, and step S670 is executed. In step S670, the display coordinate of the recognition information IFO of the second picture PF2 is not updated, that is, the display coordinate of the recognition information IFO3 of the third picture PF3 is served as the compensated coordinate PXY, as shown in FIG. 7C. As a result, the jitter of the recognition information IFO on the display screen 120 may be reduced.

Figure 8:
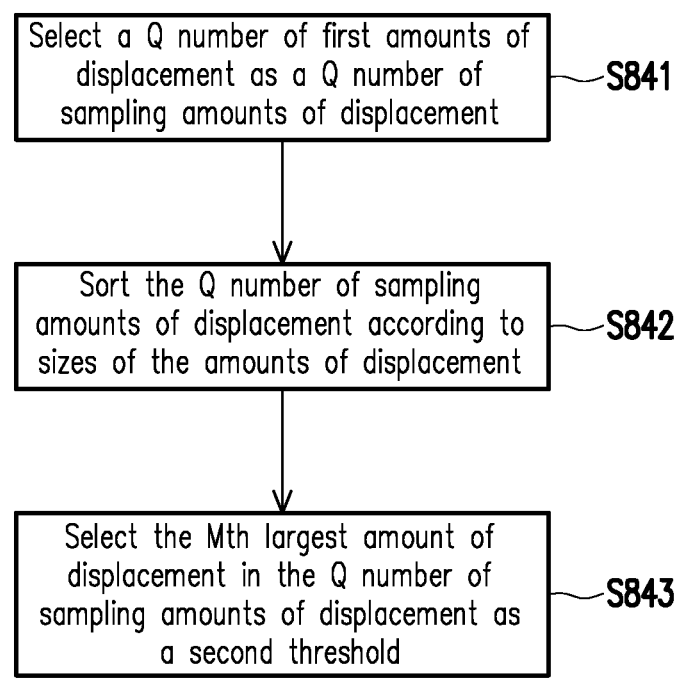
FIG. 8 is a flowchart of the detailed steps of step S640 shown according to an embodiment of the disclosure.

FIG. 8 is a flowchart showing the detailed steps of step S640 shown according to an embodiment of the disclosure. Please refer to FIG. 8. In step S841, a Q number of a plurality of first amounts of displacement are selected as a Q number of sampling amounts of displacement. In step S842, the Q number of sampling amounts of displacement are sorted according to the sizes of the amounts of displacement. In step S843, an Mth largest amount of displacement in the Q number of sampling amounts of displacement is selected as the second threshold TH2, wherein M may be a picture quantity that the display coordinate of the recognition information IFO to be updated per unit time.

In an embodiment of the disclosure, the quantity Q may be determined according to the picture update frequency of the display screen 120 and the picture quantity M that the display coordinate of the recognition information IFO to be updated per unit time. As an example, a picture update frequency f of the display screen 120 is 30 pictures per second, and the picture quantity M that the display coordinate of the recognition information IFO to be updated every second is three. Therefore, the quantity Q of the sampling amounts of displacement may be set to 10 (i.e., Q=f÷M). Then, 10 out of the plurality of first amounts of displacement are selected to obtain 10 sampling amounts of displacement, and the 10 sampling amounts of displacement are sorted according to the sizes of the amounts of displacement. Then, among the 10 sampling amounts of displacement, the third largest amount of displacement is selected as the second threshold TH2.

Next, the details of compensating the display coordinate of the recognition information of the second picture in the spatial domain in step S556 of FIG. 5 is described. Referring to FIG. 1, FIG. 2, and FIG. 5 again, in order to reduce the spatial jitter of the recognition information IFO of the dynamic object OB, the compensated coordinate PXY may be calculated according to a moving average algorithm. A moving average calculation may be performed on the display coordinate of the recognition information IFO in the second picture before compensation and the plurality of display coordinates of the recognition information IFO in the first pictures before compensation to obtain the compensated coordinate PXY.

In an embodiment of the disclosure, the compensated coordinate PXY may be calculated according to a simple moving average (SMA) algorithm, a weighted moving average (WMA) algorithm, or an exponential moving average (EMA) algorithm, but the disclosure is not limited thereto.

Figure 9:
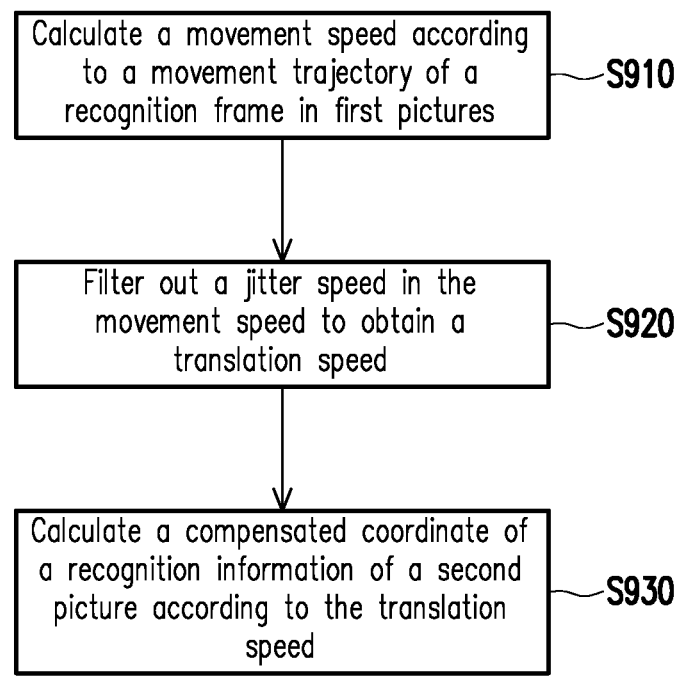
FIG. 9 is a flowchart of the detailed steps of step S558 shown according to an embodiment of the disclosure.
Figure 10:
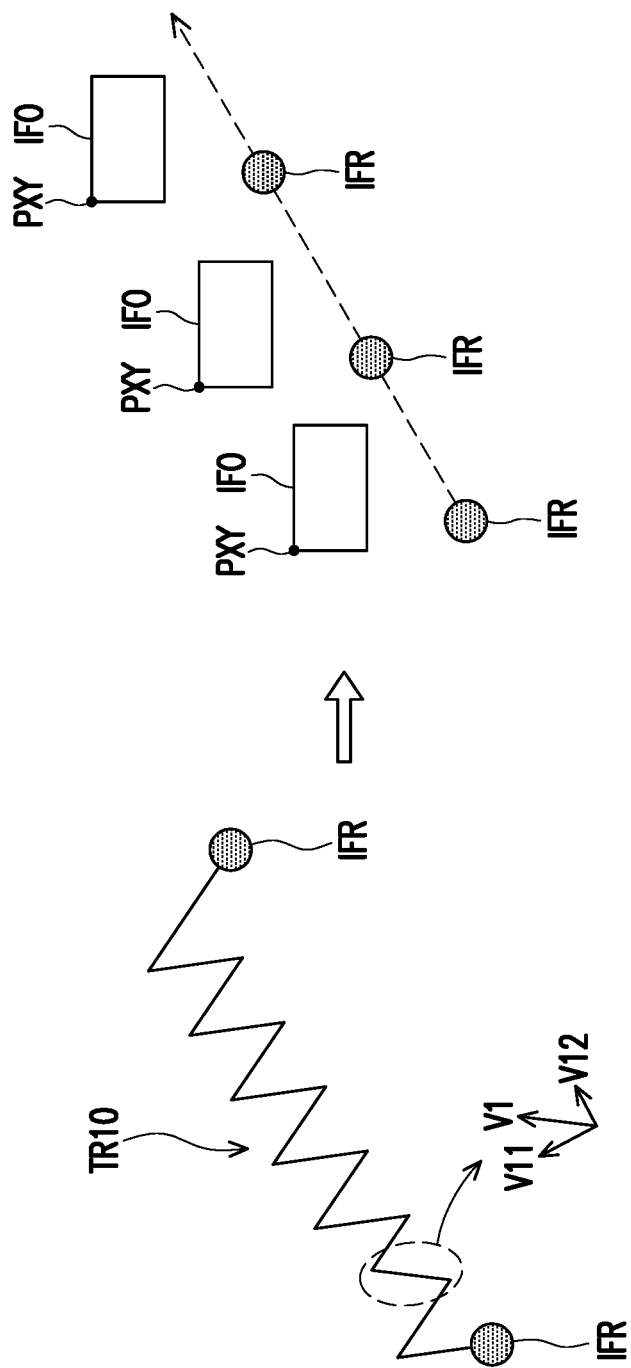
FIG. 10 is a schematic of the reduction of a jitter of a recognition information according to an embodiment of the disclosure.

The detailed steps of step S558 of FIG. 5 are described below. FIG. 9 is a detailed flowchart of step S558 shown according to an embodiment of the disclosure, and FIG. 10 is a schematic of reducing the jitter of a recognition information according to an embodiment of the disclosure. Please refer to FIG. 1, FIG. 2, FIG. 9, and FIG. 10 together. In step S910, a movement speed V1 is calculated according to a movement trajectory TR10 of the recognition frame IFR in the first pictures. The movement speed V1 includes a jitter speed V11 and a translation speed V12, wherein the direction of the jitter speed V11 is perpendicular to the direction of the translation speed V12, as shown in FIG. 10. In addition, the direction of the translation speed V12 may be substantially regarded as the direction from the recognition frame IFR of the first first picture to the recognition frame IFR of the last first picture. In step S920, the jitter speed V11 in the movement speed V1 is filtered out to obtain the translation speed V12. In step S930, the compensated coordinate PXY of the recognition information IFO of the second picture is calculated according to the translation speed V12. As a result, the jitter of the recognition information IFO of the second picture may be reduced.

In another embodiment of the disclosure, when the movement of the dynamic object OB is a movement with a net direction and a net speed, the movement trajectory of the dynamic object OB may also be predicted, and the recognition information of the dynamic object OB is displayed according to the predicted movement trajectory.

Figure 11:
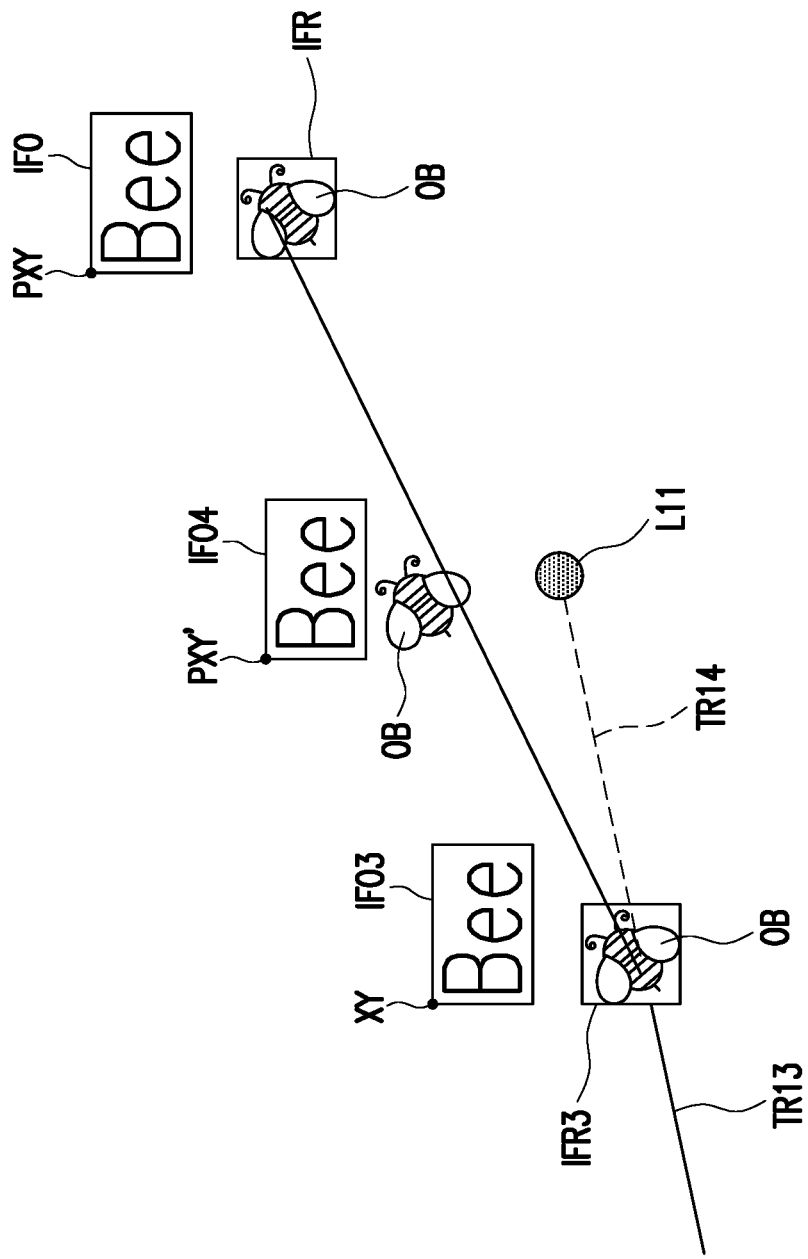
FIG. 11 is a schematic of the reduction of a jitter of a recognition information according to another embodiment of the disclosure.

For instance, FIG. 11 is a schematic of the reduction of a jitter of a recognition information according to another embodiment of the disclosure. FIG. 11 shows the recognition frame IFR3 and the recognition information IFO3 of the dynamic object OB in the third picture of the picture sequence, a recognition information IFO4 of the dynamic object OB in the fourth picture of the picture sequence, and the recognition frame IFR and the recognition information IFO of the dynamic object OB in the second picture. The third picture is prior to the fourth picture in terms of time sequence, and the fourth picture is prior to the second picture in terms of time sequence.

Please refer to FIG. 1 and FIG. 11 together. The tracking speed and recognition speed of the processing device 160 for the dynamic object OB may be lower than the picture update speed of the display screen 120. Before the processing device 160 obtains the compensated coordinate PXY of the recognition information IFO of the second picture, a display coordinate PXY' of the recognition information IFO4 of the fourth picture may be predicted according to a movement trajectory TR13 of the recognition frame IFR3 of the third picture. The processing device 160 may predict a movement trajectory TR14 of the dynamic object OB from the third picture to the fourth picture, a position L11 of the dynamic object OB in the fourth picture, and the display coordinate PXY' of the recognition information IFO4 according to the direction of the movement trajectory TR13. Then, the processing device 160 may display the recognition information IFO4 on the display screen 120 according to the predicted display coordinate PXY' to reduce the visual discontinuity of the recognition information IFO4, thereby improving user comfort. In an embodiment of the disclosure, the processing device 160 may predict the display coordinate PXY' according to the display coordinate XY of the recognition information IFO3 of the third picture, the vector of the movement trajectory TR13, and an extrapolation method, but is not limited thereto.

The information display system and the information display method provided by the embodiments of the disclosure may compensate the display coordinate of the recognition information of the dynamic object when the dynamic object moves or jitters to reduce the jitter of the recognition information and visual discontinuity, thereby improving the comfort of the user when viewing the object and the recognition information thereof.

It will be apparent to those skilled in the art that various modifications and variations may be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. An information display method, comprising:
    capturing a picture sequence by an image-capture device; and
    executing the following steps by a processing device:
        recognizing at least one dynamic object in the picture sequence to obtain a recognition frame and a recognition information corresponding to the at least one dynamic object;
        tracking the recognition frame of a plurality of first pictures in the picture sequence to obtain a tracking result;
        compensating a display coordinate of the recognition information of a second picture in the picture sequence according to the tracking result to obtain a compensated coordinate, wherein the first pictures are prior to the second picture in terms of a time sequence; and
        displaying the recognition information on a display screen according to the compensated coordinate.

2. The information display method of claim 1, wherein the tracking result comprises:
    a plurality of first amounts of displacement, wherein each of the first amounts of displacement is an amount of displacement of the recognition frame between adjacent pictures in the first pictures; and
    a second amount of displacement, wherein the second amount of displacement is an amount of displacement of the recognition frame between a first one and an Nth one of the first pictures, wherein N is a quantity of the first pictures.

3. The information display method of claim 2, wherein the step of compensating the display coordinate of the recognition information of the second picture according to the tracking result comprises:
    calculating a dynamic indicator $$F = \frac{U2}{U1\sqrt{(N-1)}},$$

wherein U2 is the second amount of displacement and U1 is an average value of the first amounts of displacement;
    compensating a display coordinate of the recognition information of the second picture in at least one of a time domain and a spatial domain if the dynamic indicator is less than a reference value; and
    calculating the compensated coordinate according to a movement trajectory of the recognition frame in the first pictures if the dynamic indicator is greater than or equal to the reference value.

4. The information display method of claim 3, wherein the step of compensating the display coordinate of the recognition information of the second picture in the spatial domain comprises:
    performing a moving average calculation on the display coordinate of the recognition information in the second picture before compensation and a plurality of display coordinates of the recognition information in the first pictures before compensation to obtain the compensated coordinate.

5. The information display method of claim 3, wherein the step of compensating the display coordinate of the recognition information of the second picture according to the movement trajectory of the recognition frame in the first pictures comprises:
    calculating a movement speed according to the movement trajectory of the recognition frame in the first pictures, wherein the movement speed comprises a jitter speed and a translation speed;
    filtering the jitter speed in the movement speed to obtain the translation speed, wherein a direction of the jitter speed is perpendicular to a direction of the translation speed; and
    calculating the compensated coordinate according to the translation speed.

6. The information display method of claim 5, wherein the step of compensating the display coordinate of the recognition information of the second picture according to the movement trajectory of the recognition frame in the first pictures further comprises:
    predicting a display coordinate of a recognition information of a fourth picture according to a movement trajectory of the recognition frame of a third picture before obtaining the compensated coordinate; and
    displaying the recognition information on the display screen according to the predicted display coordinate, wherein the third picture is prior to the fourth picture in terms of a time sequence, and the fourth picture is prior to the second picture in terms of a time sequence.

7. The information display method of claim 3, wherein the step of compensating the display coordinate of the recognition information of the second picture in the time domain comprises:
    calculating an amount of displacement between a recognition information of a third picture and the recognition information of the second picture as a third amount of displacement, wherein the third picture is a previous picture of the second picture; and controlling the display screen to not display the recognition information corresponding to the second picture if the third amount of displacement is greater than or equal to a first threshold.

8. The information display method of claim 7, wherein the step of compensating the display coordinate of the recognition information of the second picture in the time domain further comprises:

determining a second threshold according to the first amounts of displacement;

calculating the compensated coordinate according to a display coordinate of the recognition information of the third picture and the third amount of displacement if the third amount of displacement is less than the first threshold and greater than or equal to the second threshold; and taking a display coordinate of the recognition information of the third picture as the compensated coordinate if the third amount of displacement is less than the second threshold, wherein the second threshold is less than the first threshold.

9. The information display method of claim 8, wherein the step of obtaining the second threshold according to the first amounts of displacement comprises:

selecting a Q number of the first amounts of displacement as a Q number of sampling amounts of displacement;

sorting the Q number of sampling amounts of displacement according to sizes of the amounts of displacement; and selecting an Mth largest amount of displacement in the Q number of sampling amounts of displacement as the second threshold, wherein M is a picture quantity that a display coordinate of the recognition information to be updated per unit time.

10. The information display method of claim 9, wherein the quantity Q is determined according to a picture update frequency of the display screen and the picture quantity that the display coordinate of the recognition information to be updated per unit time.

11. An information display system, comprising:

a display screen;

an image-capture device configured to capture a picture sequence; and a processing device coupled to the display screen and the image-capture device and configured to recognize at least one dynamic object in the picture sequence and generate a recognition frame and a recognition information corresponding to the at least one dynamic object, wherein the processing device tracks the recognition frame of a plurality of first pictures in the picture sequence to obtain a tracking result, compensates a display coordinate of the recognition information of a second picture in the picture sequence according to the tracking result to obtain a compensated coordinate, and displays the recognition information on the display screen according to the compensated coordinate, wherein the first pictures are prior to the second picture in terms of a time sequence.

12. The information display system of claim 11, wherein the tracking result comprises:

a plurality of first amounts of displacement, wherein each of the first amounts of displacement is an amount of displacement of the recognition frame between adjacent pictures in the first pictures; and a second amount of displacement, wherein the second amount of displacement is an amount of displacement of the recognition frame between a first one and an Nth one of the first pictures, wherein N is a quantity of the first pictures.

13. The information display system of claim 12, wherein: the processing device calculates a dynamic indicator $$F = \frac{U2}{U1\sqrt{(N-1)}},$$

wherein U2 is the second amount of displacement and U1 is an average value of the first amounts of displacement, wherein the processing device compensates a display coordinate of the recognition information of the second picture in at least one of a time domain and a spatial domain if the dynamic indicator is less than a reference value, wherein the processing device calculates the compensated coordinate according to a movement trajectory of the recognition frame in the first pictures if the dynamic indicator is greater than or equal to the reference value.

14. The information display system of claim 13, wherein: when the processing device compensates the display coordinate of the recognition information of the second picture in the spatial domain, the processing device performs a moving average calculation on the display coordinate of the recognition information in the second picture before compensation and a plurality of display coordinates of the recognition information in the first pictures before compensation to obtain the compensated coordinate.

15. The information display system of claim 13, wherein: the processing device calculates a movement speed according to the movement trajectory of the recognition frame in the first pictures if the dynamic indicator is greater than or equal to the reference value, wherein the movement speed comprises a jitter speed and a translation speed, and a direction of the jitter speed is perpendicular to a direction of the translation speed, wherein the processing device filters out the jitter speed in the movement speed to obtain the translation speed and calculates the compensated coordinate according to the translation speed.

16. The information display system of claim 15, wherein: before the processing device obtains the compensated coordinate, the processing device predicts a display coordinate of a recognition information of a fourth picture according to a movement trajectory of a recognition frame of a third picture and displays the recognition information on the display screen according to the predicted display coordinate, wherein the third picture is prior to the fourth picture in terms of a time sequence, and the fourth picture is prior to the second picture in terms of a time sequence.

17. The information display system of claim 13, wherein: when the processing device compensates the display coordinate of the recognition information of the second picture in the time domain, the processing device calculates an amount of displacement between a recognition information of a third picture and the recognition information of the second picture as a third amount of displacement, wherein the third picture is a previous picture of the second picture, the processing device controls the display screen to not display the recognition information corresponding to the second picture if the third amount of displacement is greater than or equal to a first threshold.

18. The information display system of claim 17, wherein:

the processing device further determines a second threshold according to the first amounts of displacement, wherein the second threshold is less than the first threshold, the processing device calculates the compensated coordinate according to the display coordinate of the recognition information of the third picture and the third amount of displacement if the third amount of displacement is less than the first threshold and greater than or equal to the second threshold, the processing device takes the display coordinate of the recognition information of the third picture as the compensated coordinate if the third amount of displacement is less than the second threshold.

19. The information display system of claim 18, wherein:

the processing device selects a Q number of the first amounts of displacement as a Q number of sampling amounts of displacement, sorts the Q number of sampling amounts of displacement according to sizes of the amounts of displacement, and selects an Mth largest amount of displacement in the Q number of sampling amounts of displacement as the second threshold, wherein M is a picture quantity that a display coordinate of the recognition information to be updated per unit time.

20. The information display system of claim 19, wherein the quantity Q is determined according to a picture update frequency of the display screen and the picture quantity that the display coordinate of the recognition information to be updated per unit time.

* * * * *